Dec. 1, 1925.

J. H. WAGENHORST 1,563,810

DEMOUNTABLE RIM WITH ATTACHED CLAMPING LUG

Filed June 12, 1923

Inventor
J. H. Wagenhorst
By Hull Brock & West
Attys.

Patented Dec. 1, 1925.                                                   1,563,810

UNITED STATES PATENT OFFICE.

JAMES H. WAGENHORST, OF JACKSON, MICHIGAN.

DEMOUNTABLE RIM WITH ATTACHED CLAMPING LUG.

Application filed June 12, 1923. Serial No. 644,968.

*To all whom it may concern:*

Be it known that I, JAMES H. WAGENHORST, a citizen of the United States, residing at Jackson, in the county of Jackson and State of Michigan, have invented a certain new and useful Improvement in Demountable Rims with Attached Clamping Lugs, of which the following is a full, clear, and exact description, reference being had to the accompanying drawings.

This invention relates generally to demountable tire carrying rims of the attached lug type, and more particularly to certain improvements in the rim fastening means forming a part thereof. The object of the invention is to provide a novel construction of lug which will be stronger than the attached lugs heretofore used, and which can be quickly, easily and more securely connected to the tire carrying rim.

With this object in view the invention consists in the novel features of construction hereinafter fully described and set forth in the appended claims.

In the drawings forming a part of this specification Fig. 1 is a transverse sectional view of a tire carrying rim having my improved form of lug connected thereto.

Figure 1:
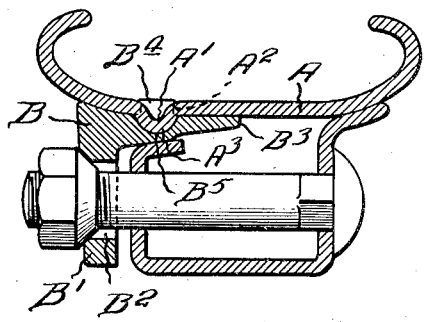
Figure 4:
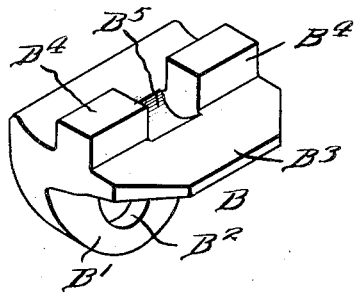
Fig. 4 is a detail view of the lug before being attached to the rim base.
Figure 2:
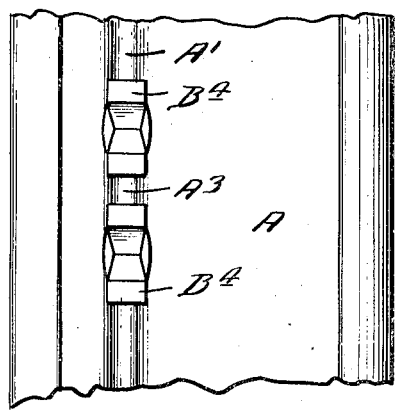
Fig. 2 is a plan view showing a portion of the rim base to which the lug is attached.
Figure 5:
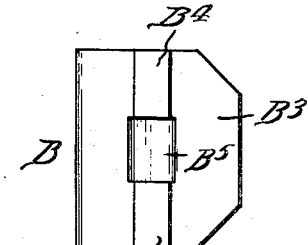
Fig. 5 is a plan view of said lug detached from the base.
Figure 3:
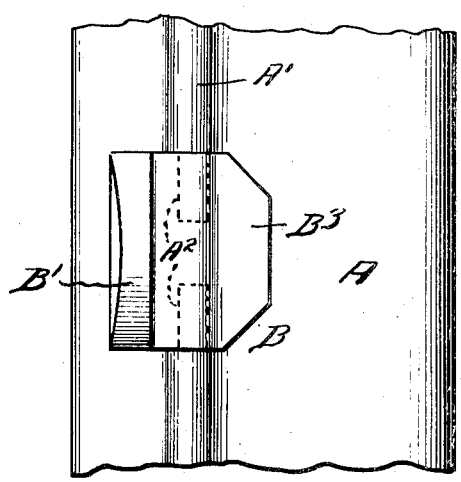
Fig. 3 is an inverted plan view of the same.

In carrying out my invention I employ a demountable tire carrying rim A which may be of the clencher or straight side type as preferred, and this rim is preferably formed with an inrolled bead A′.

The demountable tire carrying rim A has a series of lugs B permanently connected thereto for the purpose of demountably securing the tire carrying rim to the fixed rim or wheel body.

These lugs B, each comprise an inwardly projecting member B′ which is apertured at B² to receive the transverse bolt passing through the fixed rim, and also a laterally extending member B³ which contacts with the inner face of the rim base; and this laterally projecting member is formed with spaced outwardly projecting riveting studs B⁴, these spaced outwardly projecting studs passing through spaced apertures A² produced at regular intervals in the rim base, and leaving an intervening or bridge portion A³ between the spaced openings A².

In the outer face of the member B³ and between the outwardly projecting studs B⁴, I form a depression or recess B⁵ without perforating the member B³, but, of sufficient depth to receive the inwardly projecting bridge portion A³, when the outwardly projecting studs B⁴ are projected through the spaced openings A², and this depression or recess B⁵ will provide a suitable support for the bridge portion A³ when the spaced outwardly projecting studs are split and riveted down for the purpose of rigidly attaching the lugs to the rim base; the outwardly projecting studs being split and spread in opposite directions and forced into the circumferential groove when an inrolled bead is provided, and when an inrolled bead is not provided the ends of the studs are split and spread over into engagement with the outer face of the rim base, and when attaching the lug of the kind described to a flat rim base the bridge portion A³ in between the spaced openings A² may be punched inwardly into the depression or recess B⁵ formed in the lug between the outwardly projecting studs, thereby more effectually uniting the lug and rim base and also providing a slight groove or depression in the rim base to receive the contiguous riveted over ends of the outwardly extending studs.

A lug constructed and attached in the manner described can be quickly and easily produced and when attached to a tire carrying rim in the manner herein set forth provides a stronger lug and also a more secure connection between the lug and rim than those heretofore employed.

Having thus described my invention, what I claim is:

1. A demountable tire-carrying rim having an inwardly-projecting bead with a pair of spaced apertures formed therein and an attached lug having an inwardly-extending portion provided with a bolt hole and an axially-extending portion comprising a single tongue, lying along the inner side of the base of said rim, and provided with spaced outwardly-extending riveting studs, extending through said apertures and riveted over, and a depression between said studs receiving the portion of said bead between said apertures.

2. A demountable tire-carrying rim having a rim base with a pair of spaced apertures formed therein and an attached lug having an inwardly-projecting portion provided with a bolt hole and an axially-extending portion comprising a single tongue, lying along the inner side of said rim base, and provided with a pair of spaced outwardly-projecting riveting studs, extending through said apertures and riveted over, and a depression between said studs adapted to receive the portion of said rim base between said apertures.

In testimony whereof, I hereunto affix my signature.

JAMES H. WAGENHORST